United States Patent [19]

Moore, Jr.

[11] 4,129,327
[45] Dec. 12, 1978

[54] SHOVEL

[76] Inventor: Claud T. Moore, Jr., 3803 Botany La., Houston, Tex. 77047

[21] Appl. No.: 816,297

[22] Filed: Jul. 18, 1977

[51] Int. Cl.² .............................. A01B 1/22; B25G 3/00
[52] U.S. Cl. .................................................... 294/58
[58] Field of Search ..................... 294/49, 53.5, 57–59; 37/137; 254/131.5

[56] References Cited

U.S. PATENT DOCUMENTS

| 161,678 | 4/1875 | Gardner | 294/58 |
|---------|--------|---------|--------|
| 725,905 | 4/1903 | Williams | 294/58 |
| 875,504 | 12/1907 | Clark | 294/58 |
| 1,182,724 | 5/1916 | Waldorf | 294/53.5 |
| 1,183,277 | 5/1916 | Collins | 294/53.5 |
| 1,449,702 | 3/1923 | Sizemore | 294/59 |
| 1,586,056 | 5/1926 | Walsh | 294/58 |
| 3,436,111 | 4/1969 | England | 294/57 X |

FOREIGN PATENT DOCUMENTS

| 6848 of | 1893 | United Kingdom | 294/53.5 |
|---------|------|----------------|----------|
| 915288 | 1/1963 | United Kingdom | 294/58 |
| 916237 | 1/1963 | United Kingdom | 294/58 |

*Primary Examiner*—Johnny D. Cherry

[57] ABSTRACT

A new and improved shovel including a shovel blade connected at one end to a main handle member and having an opposite, open end for initially engaging the ground to scoop up dirt or the like and an auxiliary handle assembly attached to the shovel blade at the opposite, open end and extending adjacent to, but independent of, the main handle member for cooperating with the main handle member to lift and maneuver a load of dirt or the like.

4 Claims, 3 Drawing Figures

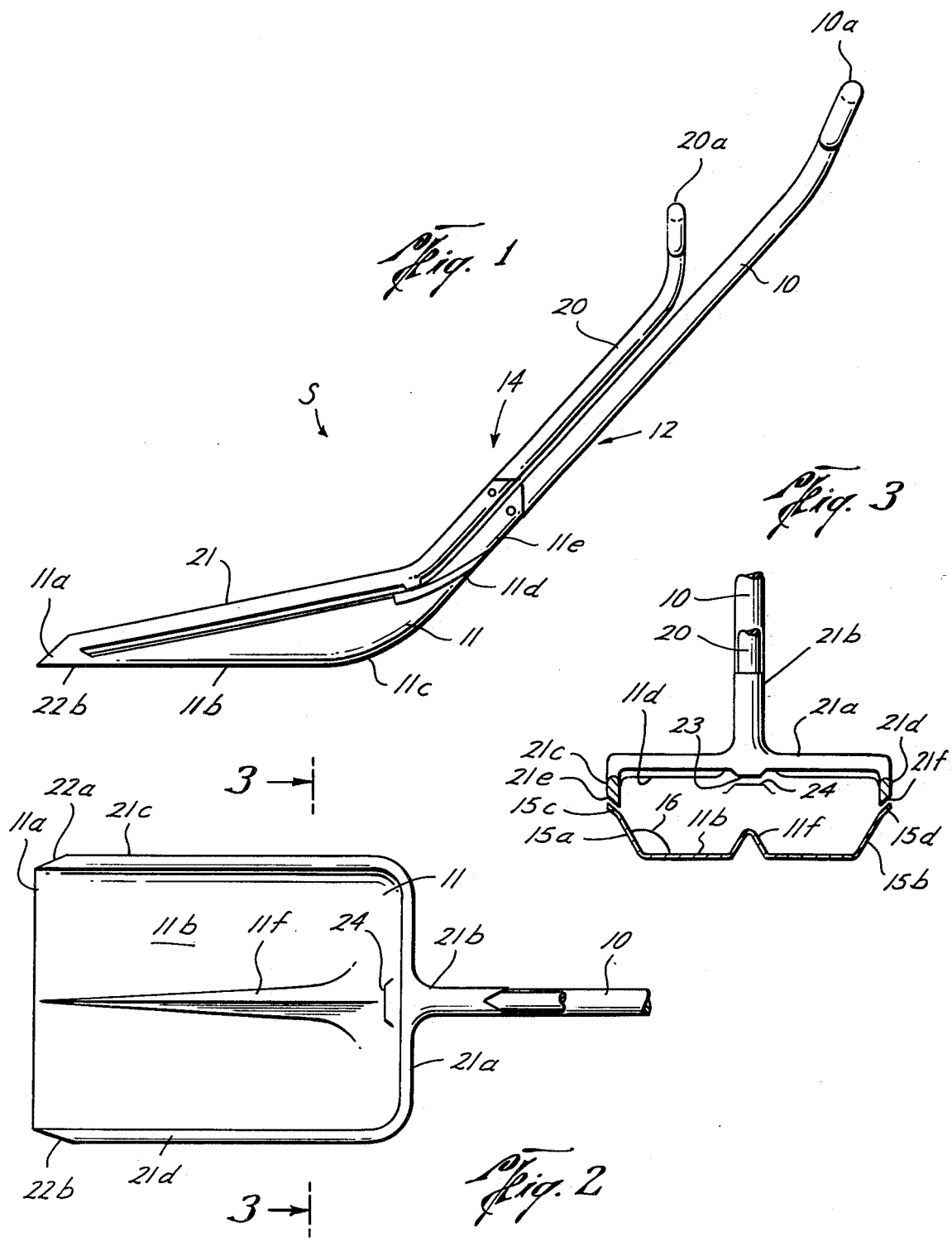

SHOVEL

BACKGROUND OF THE INVENTION

The field of this invention is shovels and in particular a new and improved shovel for maximizing lifting efficiency.

Perhaps the most common type of shovel or spade includes a single handle connected to a shovel blade. In this type of shovel, the user places one hand, the lifting hand, at some point on the main handle near to the shovel blade. The other hand, the control hand, is placed above the lifting hand nearer to or at the upper handle end. During lifting, the lifting load on the shovel blade acts as a downward force which must be overcome by an upward force exerted by the lifting hand. But the lifting hand must also overcome a downward force exerted by the control hand. For the control hand exerts a downward force to at least partly offset the moment force exerted by the load upon the lifting hand. Therefore, the lifting hand must exert an upward force to overcome not only the downward force of the load but also the downward force exerted by the control hand. This problem has been at least partly recognized in U.S. Pat. No. 3,436,111.

Attempts to improve upon the common shovel such as just described have been numerous, beginning more than a century ago as evidenced by patents. U.S. Pat. No. 61,784 discloses a snow shovel having an auxiliary handle connected to the rear of the shovel blade. U.S. Pat. Nos. 3,367,704; 2,416,414; 2,337,643; 1,411,166; and, 1,305,079 all disclose shovels which utilize an additional lifting handle which is connected to the shovel blade at the rear or upper end of the shovel blade, which is at the point of attachment of the shovel blade to the handle. U.S. Pat. No. 3,436,111 discloses a shovel blade which utilizes a main, offset handle for moving the position of the lifting hand nearer to the center of gravity of the load.

Other patents directed to the utilization of auxiliary lifting handles include U.S. Pat. Nos. 3,751,094; 3,466,078; 2,826,835; 2,772,910; 2,531,227; and, 826,928. All of these patents disclose the concept of auxiliary handles connected directly to the main handle, itself.

SUMMARY OF THE INVENTION

It is an object of this invention to provide a new and improved shovel which minimizes the lifting force necessary to easily maneuver the shovel and load.

It is a further object of this invention to provide a new and improved shovel which applies the lifting force to the open end of the shovel and thus on the opposite side of the shovel blade load from known force applications.

The new and improved shovel of the preferred embodiment of this invention includes a shovel blade which is connected on one end to a main handle member and is open at the opposite end for initially engaging the ground to scoop up dirt and the like. An auxiliary handle assembly is attached to the shovel blade at the opposite, open end thereof and extends parallel to but separate from the main handle member for cooperating with the main handle member to lift and maneuver a load of dirt or the like. The auxiliary handle assembly includes a shovel connector and an auxiliary handle member attached to the shovel connector. The shovel connector connects the auxiliary handle to the opposite, open shovel end for directing lifting force applied to the auxiliary handle to the open end of the shovel.

These features and other features of this invention will be described in greater detail hereinafter. It should be understood that the features just described are merely representative of the patentable features of this invention, which are set forth in the claims.

BRIEF DESCRIPTION OF THE DRAWINGS

FIG. 1 is a side view of the improved shovel of the preferred embodiment of this invention;

FIG. 2 is a top view of the shovel blade and the connection of the independently mounted auxiliary handle assembly to the open end of the shovel blade; and FIG. 3 is a sectional view of the improved shovel taken along line 3—3 of FIG. 2.

DESCRIPTION OF THE PREFERRED EMBODIMENT

Referring to the drawings, the letter S generally designates the new and improved shovel of the preferred embodiment of this invention. The shovel S basically includes a main handle 10 which is connected to a shovel blade 11 thus forming what may be described as a typical main shovel assembly 12 which is, of course, known in the prior art. An auxiliary handle assembly 14 is attached to the main shovel assembly 12 and provides means for directing lifting force to open shovel blade end 11a.

The shovel blade 11 is basically rectangular in configuration as viewed from the top view of FIG. 2. The shovel blade includes a main substantially flat portion of pan 11b which curves upwardly at 11c to form a raised, end portion 11d. The raised end portion 11d includes a mounting tube or sleeve section 11e which is welded or otherwise attached to the raised end 11d for receiving the rod-shaped handle 10 in a known manner. The handle 10 may terminate in a triangular upper end handle portion 10a also known in the prior art. The pan portion 11b of the shovel blade 11 includes a central, raised ridge portion 11f which is substantially an inverted V-shape as viewed in FIG. 3. The ridge 11f increases in size from open, shovel end 11a toward rear, raised shovel end 11d. The open shovel end 11a terminates in a straight edge which may be sharpened to enhance insertion of the shovel blade into the ground or the like. The shovel blade 11 includes raised sides 15a and 15b which extend upwardly from the shovel pan or bed 11b at an obtuse angle 16 with respect thereto. The raised side 15a terminates in raised side edge 15c, which is also at an obtuse angle with respect to the shovel blade pan 11b. Similarly, the raised side 15b terminates in raised side edge 15d. The raised side edges 15c and 15d cooperate with raised end 11d to provide a U-shaped peripheral edge to the shovel blade 11.

Although the shovel blade 11 has been described as being generally rectangular in configuration as viewed from the top, it should be understood that the actual configuration may differ substantially from the generally rectangular configuration illustrated. For, there are many different shapes and types of shovel blades which can be adapted to the concept of this invention. However, for the purposes of ease in describing this invention, the shovel blade herein will continue to be described as being rectangular in configuration.

The auxiliary handle assembly 14, which is also described as a means for directing lifting force to open shovel blade end 11a, includes an auxiliary handle 20 attached to a lift force connector 21, which is connected to the shovel blade 11 at open end 11a thereof. The lift force connector 21 is a yoke or fork having a U-shaped configuration. The lift force connector 21 includes an end portion 21a having integrally formed therewith a tube or sleeve-type connecting portion 21b which receives the auxiliary handle 20. The auxiliary handle 20 terminates in a triangular-shaped handle portion 20a similar to handle end portion 10a. Side members 21c and 21d are integrally connected to the end member 21a to provide the U-shaped configuration for the lift force connector 21. The side members 21c and 21d are welded or otherwise attached to the corners 22a and 22b of the shovel blade 11. The corners 22a and 22b are formed by shovel open end 11a and raised sides 15a and 15b, respectively.

The lift force connector member 21c extends parallel to raised shovel blade edge 15c and includes a lower, inclined surface 21e which is capable of mating engagement against raised edge 15c. Similarly, the side member 21d terminates in an inclined or bevelled edge 21f capable of mating engagement against raised side edge 15d of the shovel blade 11. A node portion or rest 23 is welded or formed integrally with lift force connector end 21a on the bottom thereof and is adapted to engage a raised support area or rest 24 formed in shovel blade 11b below the lift force rest 23.

In operation and use of the improved shovel S of this invention, the user places his lifting hand upon auxiliary handle end 20a and his control hand upon main handle end portion 10a. The open shovel blade end 11a is then inserted into the ground. Or, if the nature of the ground or other material being dug into requires more digging force, the user may actually wish to grip the main handle end portion 10a only and press the shovel blade 11 into the ground with his foot directed against raised shovel blade end 11d. After the shovel blade 11 has been moved into and under the load, the load is ready to be lifted. The user then places his lifting hand upon the auxiliary handle end portion 20a and his control hand upon the main handle portion 10a and the shovel S is ready to lift the load located in the shovel blade 11 upwardly. Application of lifting force by the lifting hand at 20a actually directs the lifting force to the locus of the open shovel blade end at 11a. Thus, the lifting moment, which would be the force of lifting applied at 20a times the distance through which the force is applied, as measured between handle end 20a and shovel end 11a, is at a maximum value due to the distance from the handle portion 20a to the shovel end 11a. This lifting moment offsets and balances against the moment exerted by the load located in the shovel 11 and reduces the need for a downward force being exerted by the control hand at 10a in order to keep the load balanced. The reduction of the downward force to be exerted by the control hand at 10a reduces the overall lifting force necessary to be applied by the lifting hand at 20a, thereby actually decreasing the amount of force necessary to be exerted to move the load in the shovel blade 11. Thus, the lifting exertion to be applied by the user is minimized by redirecting the lifting force to the outside end 11a of the shovel blade. The lift force connector 21, side members 21c and 21d, is pressed downwardly against side edges 15c and 15d and against rest 24 whenever downward pressure is exerted upon the auxiliary handle 20 so that the lift force connector cooperates with shovel blade 11 to act as an integral unit. This may occur during the maneuvering of the shovel S into position to receive a load. Then, when lifting force is applied, the auxiliary handle 20 and lift force connector 21 is capable of movement and flexing independently of the shovel blade 11 and main handle 10. This is provided by the at least partly yieldable connection being provided at 22a and 22b between the open end 11a of the shovel blade and the side members 21c and 21d of the lift force connector 21. Thus, the lift force connector 21 can be locked against the shovel blade to act as a unit during actual digging but may be movable independently and separately to lift the load out of the ground by applying the lifting force to the open shovel blade end 11a. This allows the operator to take optimal advantage of leverage without interference with the actual load in the shovel blade, itself.

The foregoing disclosure and description of the invention are illustrative and explanatory thereof, and various changes in the size, shape and materials as well as in the details of the illustrated construction may be made without departing from the spirit of the invention.

For example, the configuration of the shovel blade 11 has been described as being generally rectangular. It has also been described that other types of shovel blade configurations may be utilized within the scope of this invention. The exact positioning of the auxiliary handle 20 with respect to the main handle 10, including the relative length of each, may also be adjusted for different applications.

I claim:

1. A new and improved shovel, comprising:
   a main handle member;
   a shovel blade connected on one end to said main handle member and having an opposite, open end for initially engaging the ground to scoop up dirt or the like; and
   an auxiliary handle assembly attached to said shovel blade at said opposite, open end thereof and extending adjacent to and along said main handle member and terminating in an auxiliary handle end portion unconnected to said main handle member for cooperating with said main handle member through said attachment at said shovel blade open end to lift and maneuver a load of dirt or the like in said shovel blade;
   a shovel connector means and an auxiliary handle member attached to said shovel connector means, said shovel connector means connecting said auxiliary handle to said shovel blade at said opposite, open end thereof in a non-pivotal connection;
   said shovel blade being substantially rectangular in configuration and including raised side edges in a U-shape extending from the said one end of said shovel blade to said opposite, open end; and
   said shovel connector means being positioned above and extending along said raised side edges of said shovel blade into connection with said shovel blade at said opposite, open end thereof.

2. The structure set forth in claim 1, wherein said shovel connector means includes:
   a handle attachment section for attachment to said auxiliary handle; and
   a lift force connector extending from said handle attachment section to said opposite, open shovel blade end for connection thereto.

3. A new and improved shovel, comprising:
   a main handle member;
   a shovel blade connected on one end to said main handle member and having an opposite, open end for initially engaging the ground to scoop up dirt or the like;

an auxiliary handle assembly attached to said shovel blade at said opposite, open end thereof and extending adjacent to said main handle member for cooperating with said main handle member to lift and maneuver a load of dirt or the like in said shovel blade;

said shovel blade being approximately rectangular in configuration and having raised edges on said one end attached to said main handle member and opposing raised side edges extending from said one raised end to said opposite, open end;

an auxiliary handle member positioned adjacent and parallel to said main handle;

a lift force connector attached to said auxiliary handle and extending above said raised side edges of said shovel blade into connection with said shovel blade at said opposite, open end thereof;

said raised edges of said shovel blade providing a U-shaped edge configuration;

said lift force connector being U-shaped in configuration; and said U-shaped lift force connector having a U-shaped bottom edge capable of mating engagement with said raised edges of said shovel blade.

4. The structure set forth in claim 3, including:

said U-shaped lift force connector being yieldably attached to said shovel blade for movement into mating engagement with said raised edges of said shovel blade during digging and movement away from said raised edges during lifting of said shovel blade load.

* * * * *